US007529808B1

(12) United States Patent  
Trevathan et al.

(10) Patent No.: US 7,529,808 B1  
(45) Date of Patent: May 5, 2009

(54) SYSTEMS AND METHODS OF AUTOMATIC NAVIGATION ON THE WORLD WIDE WEB

(75) Inventors: Matthew Bunkley Trevathan, Kennesaw, GA (US); John R. Dingler, Dallas, GA (US); Clinton James McCallum, Scottsdale, AZ (US); Robert Wayne Ross, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/043,120

(22) Filed: Mar. 5, 2008

(51) Int. Cl.
*G06F 15/16* (2006.01)
(52) U.S. Cl. .................. 709/217; 709/219; 709/203
(58) Field of Classification Search .......... 709/219, 709/224, 228, 217, 203; 715/745, 738, 234; 707/1, 102; 705/14; 455/556.2
See application file for complete search history.

(56) References Cited

U.S. PATENT DOCUMENTS

| 5,948,061 A * | 9/1999 | Merriman et al. ........ 709/219 |
| 5,999,971 A | 12/1999 | Buckland |
| 6,377,983 B1 * | 4/2002 | Cohen et al. ............ 709/217 |
| 6,792,458 B1 * | 9/2004 | Muret et al. ............ 709/224 |
| 6,834,372 B1 * | 12/2004 | Becker et al. ............ 715/234 |
| 6,973,436 B1 | 12/2005 | Shkedi |
| 6,993,586 B2 * | 1/2006 | Chen et al. ............ 709/228 |
| 7,054,900 B1 | 5/2006 | Goldston |
| 7,110,790 B2 * | 9/2006 | Nielsen et al. .......... 455/556.2 |
| 7,424,486 B2 * | 9/2008 | Whitman et al. ......... 707/102 |
| 2003/0055809 A1 * | 3/2003 | Bhat ...................... 707/1 |
| 2005/0132297 A1 * | 6/2005 | Milic-Frayling et al. .... 715/745 |
| 2005/0261965 A1 * | 11/2005 | Eisen et al. ............ 705/14 |
| 2006/0143568 A1 * | 6/2006 | Milener et al. .......... 715/738 |

OTHER PUBLICATIONS

PCT Publication WO0186483A2 of Tso et al., Nov. 15, 2001.
Measuring Users' Web Activity to Evaluate and Enhance Advertising Effectiveness, by Bhat et al., 2002.
iLUX Corporation Formally Launches iLUX Suite 2000("iLUX"), Jan. 17, 2000.
Anonymous Web Transactions with Crowds, Reiter et al., Feb. 1999.

* cited by examiner

*Primary Examiner*—Jungwon Chang
(74) *Attorney, Agent, or Firm*—Jackson Patent Law Office (57) ABSTRACT

Disclosed are systems and methods of automatic navigation on the world wide web. A server receives an anonymous signal from a browser, and selectively determines a resource identifier corresponding to one of the plurality of Internet domains, by accessing data structures that are stored apart from the browser. The server generates a signal corresponding to the resource identifier, and sends the signal, to allow the browser to access a signal associated with the resource identifier.

1 Claim, 13 Drawing Sheets

SYSTEMS AND METHODS OF AUTOMATIC NAVIGATION ON THE WORLD WIDE WEB

BACKGROUND OF THE INVENTION

1. Field of the Invention

This invention relates generally to computer networks and, more particularly, to systems and methods of automatic navigation on the world wide web.

2. Description of Related Art

A Web page may contain links allowing a user to visit another page, offering related content. It is sometimes desirable to customize the content depending on the previous behavior of the user. Conventional links and stateless protocols, however, present obstacles to such customization in a multi-domain environment.

SUMMARY OF THE INVENTION

To address the problem above, there is a method for a system of computer networks having a plurality of Internet domains. The method comprises receiving a first signal from a browser, the first signal being anonymous; selectively determining a resource identifier corresponding to one of the plurality of Internet domains by accessing a first data structure and a second data structure, the first data structure defining a sequence of 3 resource identifiers, the first and second data structures being stored apart from the browser; generating a second signal, the second signal corresponding to the resource identifier and a third signal, the third signal being associated with the second data structure; sending the second signal, to allow the browser to access a signal associated with the resource identifier; and responsive to the first signal, writing to the second data structure in accordance with an origin of a content of the first signal.

BRIEF DESCRIPTION OF THE DRAWINGS

References are made to the following text taken in connection with the accompanying drawings, in which.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

Figure 1:
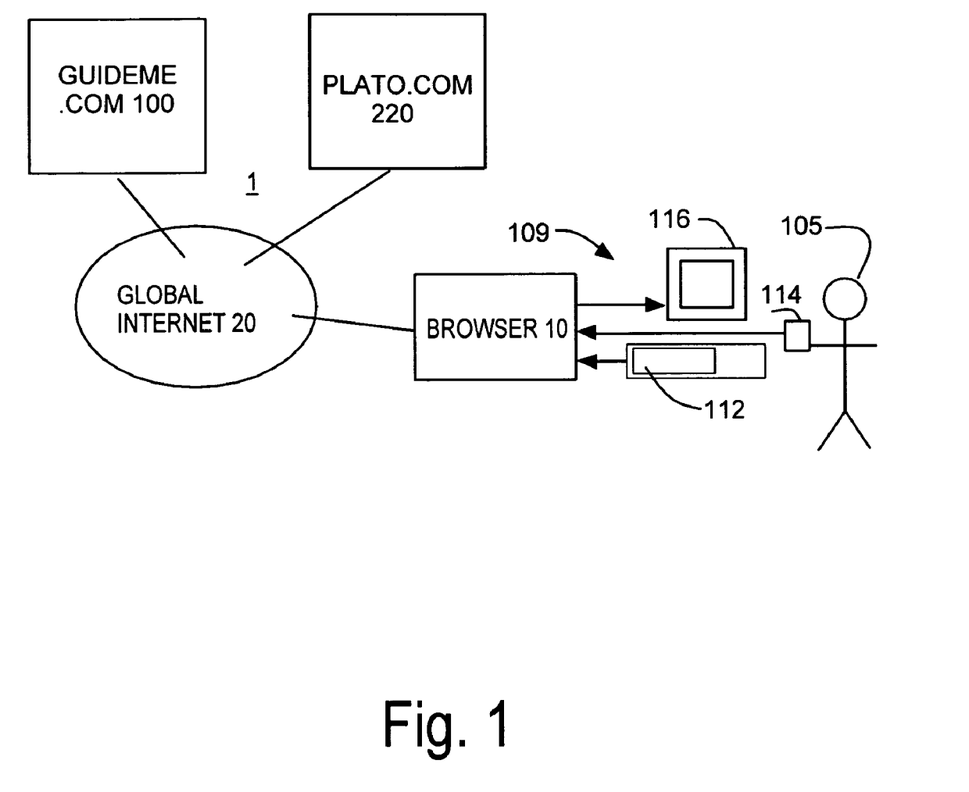
FIG. 1 shows a first exemplary system in accordance with a an embodiment of the present invention.

FIG. 1 shows guidance server 100 and plato.com server 220 according to an exemplary embodiment of the present invention. Servers 100 and 220 operate in a system including Global Internet 20, and browser 10 running on workstation 109.

Workstation 109 includes a processor executing browser 10, a mouse 114 upstream in a signal path from browser 10, a keyboard 112 upstream in a signal path from browser 10, and a display 116 downstream in a signal path from browser 10. Person 105 manipulates keyboard 112 and mouse 114 to control browser 10.

Person 105 types "plato.com" on keyboard 112 and presses the ENTER key. In response, browser 10 sends an HTTP GET request 12 (FIG. 2) to server plato.com 220, via global Internet 20.

Figure 2:
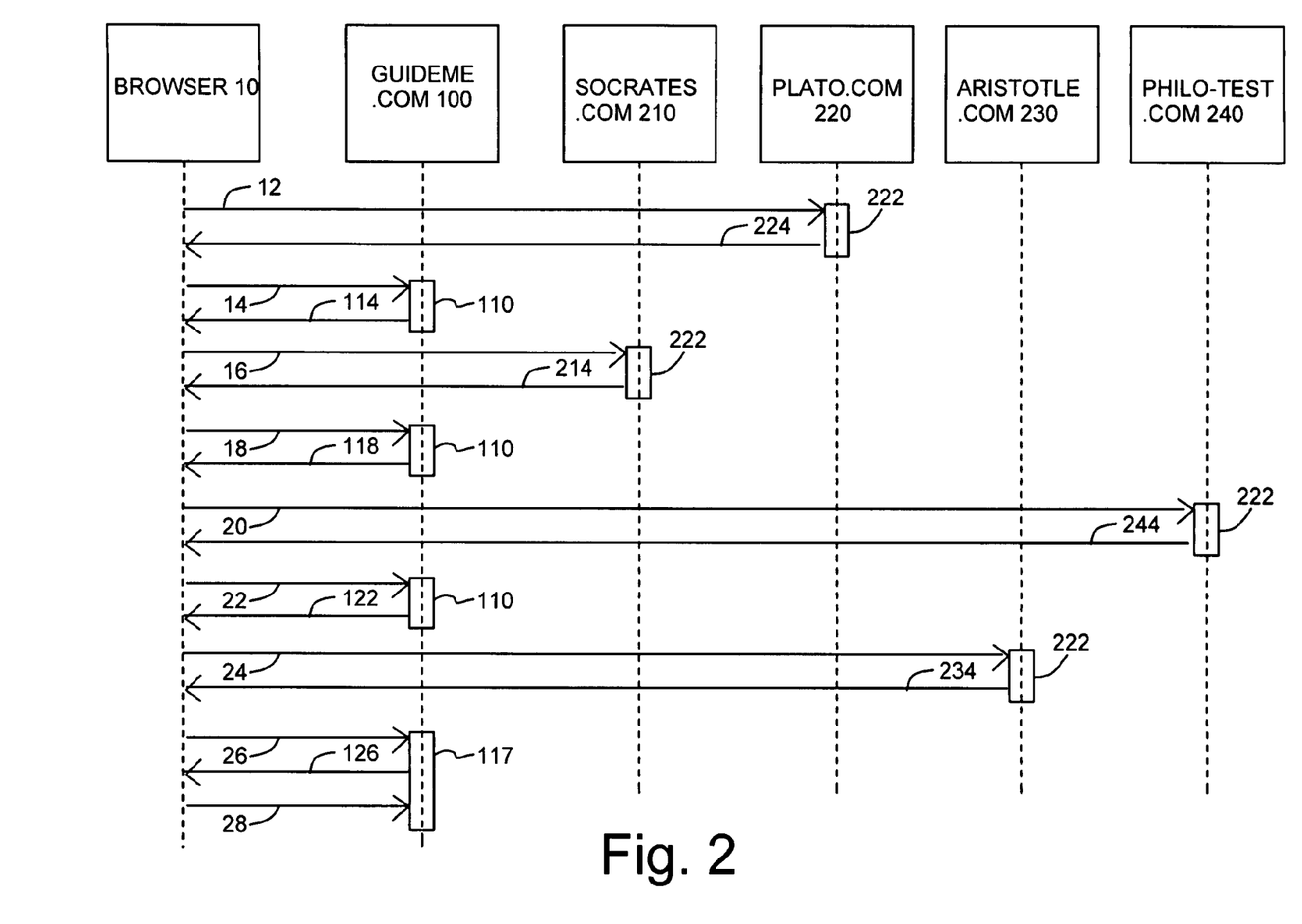
FIG. 2 is a diagram emphasizing communication in the first exemplary system.

FIG. 2 is a diagram showing sequences of HTTP requests and responses exchanged between electronic processors in system 1. Each of the rectangles under a server is a process invoked in response to an HTTP request received by the server. In process 222, server 220 generates an HTML page. If the request includes "UID= . . . " as a parameter, process 222 includes the value of UID as a hidden variable in the HTML page. (Request 12 does not include "UID= . . . " as a parameter.) Process 222 sends the HTML page to browser 10 via HTTP response 224.

Person 105 then reads the HTML page from server 220. At the end of the HTML page, there appears on screen 116 the text MORE ABOUT GREEK PHILOSOPHY. More specifically, the HTML page, generated by server 220, includes <a href="http://www.guideme/philo">MORE ABOUT GREEK PHILOSOPHY</a>.

Person 105 selects this text using mouse 114, causing browser 10 to send an HTTP request 14, containing "GET www.guideme.com/philo", to server 100.

Figure 3:
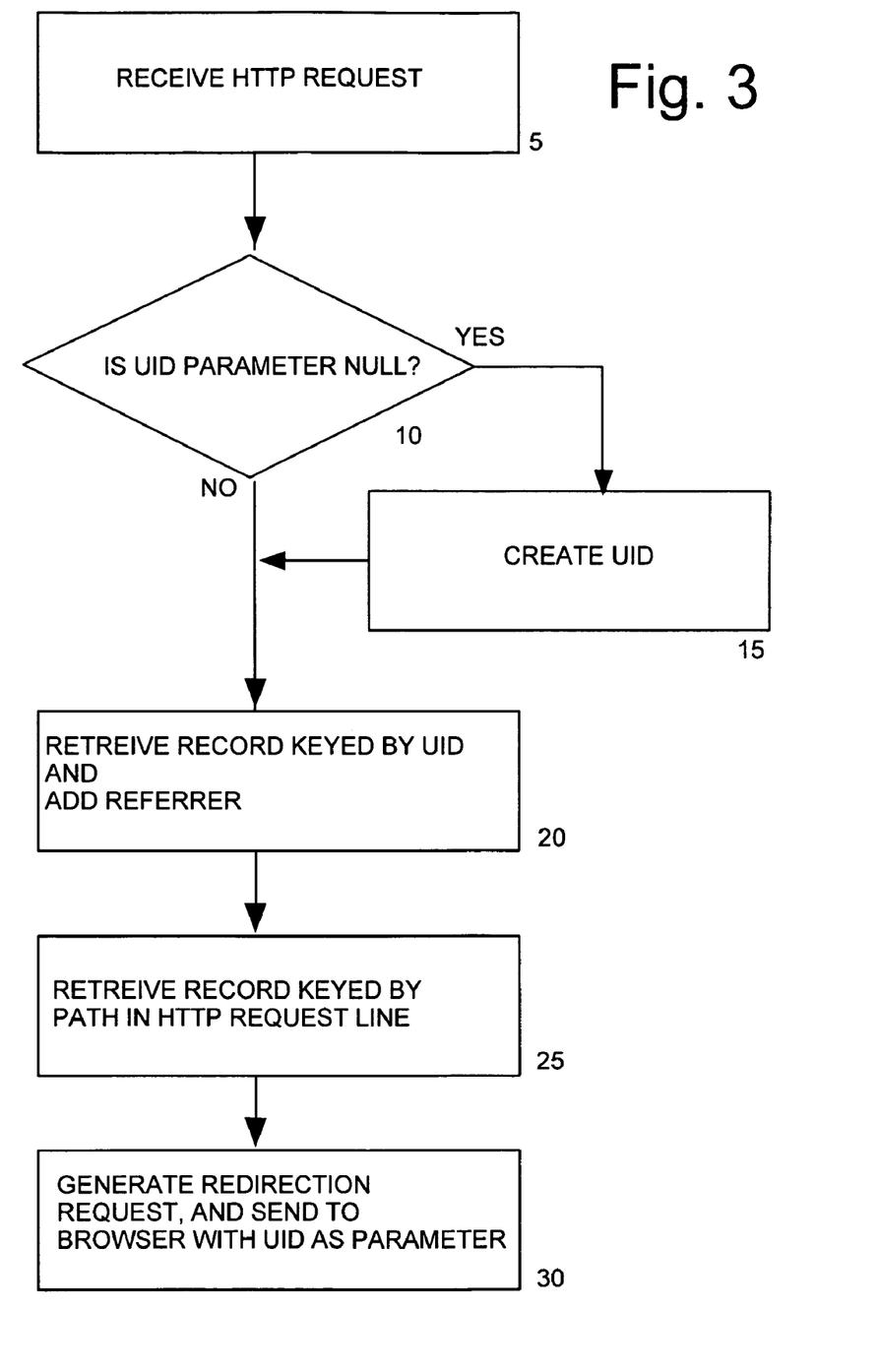
FIG. 3 is a flowchart of a process performed by a server in the first exemplary system.

FIG. 3 is a flow chart of the process 110 effected by server 100 in response to an HTTP GET having "philo" in the path of the request line. If the UID parameter of the request is null (step 10), process 110 creates an anonymous UID and creates a blank history record stored in association with the anonymous UID (step 15). Thus, in the case of responding to request 14, process 110 creates an anonymous UID and a blank history.

Process 110 retrieves the history associated with the anonymous UID and adds the Referrer Field of the HTTP header to the history. The Referrer Field contains the address of the Web page from which the HTTP request was generated.

Figure 4A:
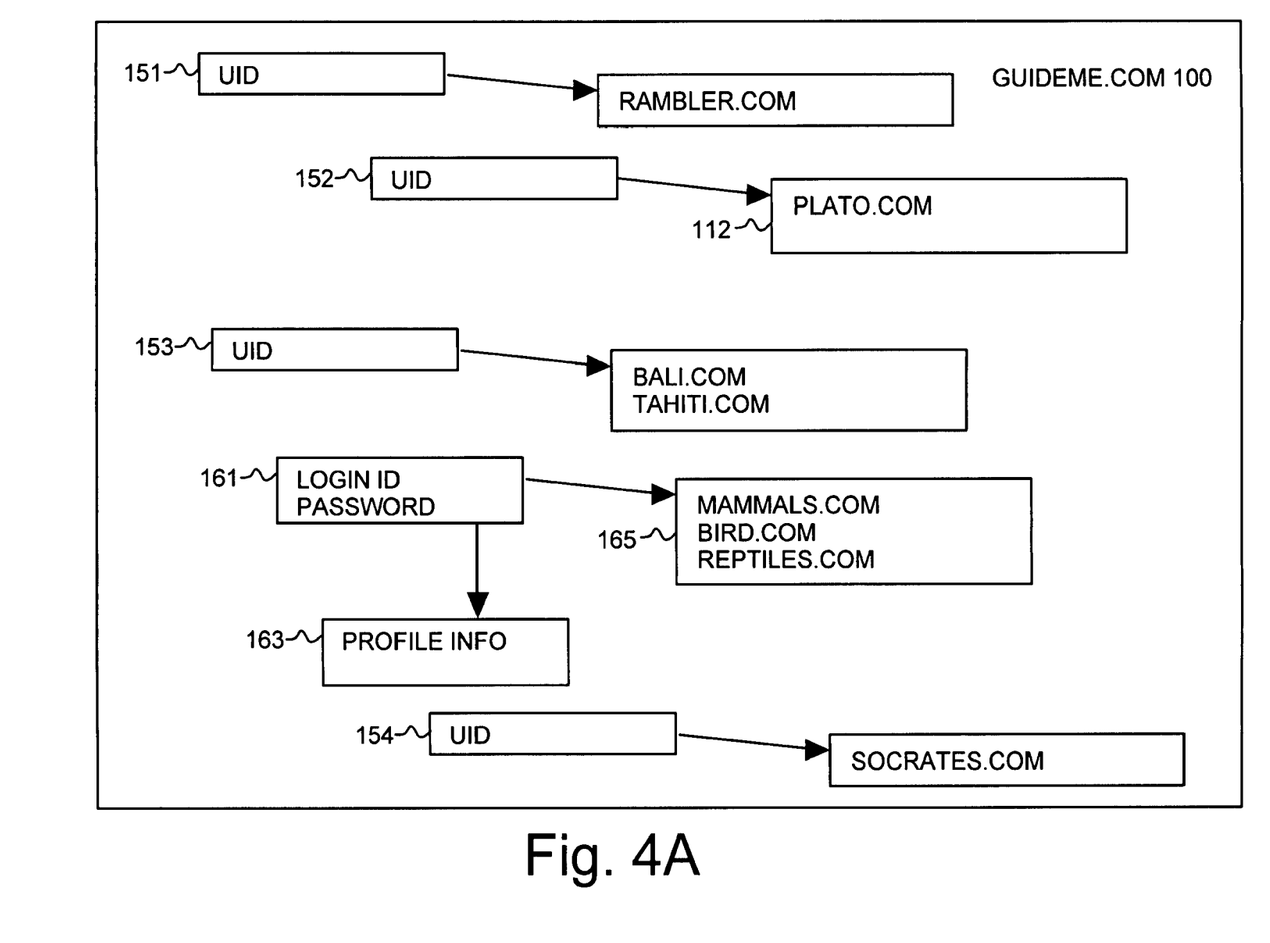
FIGS. 4A, 4B, 4C, 4D and 4E are diagrams of data structures at various points in time.

Thus, in the case of responding to request 14, FIG. 4A shows user history 112 after step 20. In the structures shown FIG. 4 and 5, lines represent a reference, such as a pointer, between one element and another. These references are not necessarily direct memory address pointers. Instead, more generally, each reference is a data entity, stored in association with one (referencing) element, that enables a processor to find a related (referenced) element. To physically address the referenced element, the processor may subject the reference to various translations or mappings.

In FIG. 4A, each of records 151, 152, 153, and 154 includes a respective anonymous user ID (UID), meaning that the UID is not associated with a login user ID and password.

Figure 5:
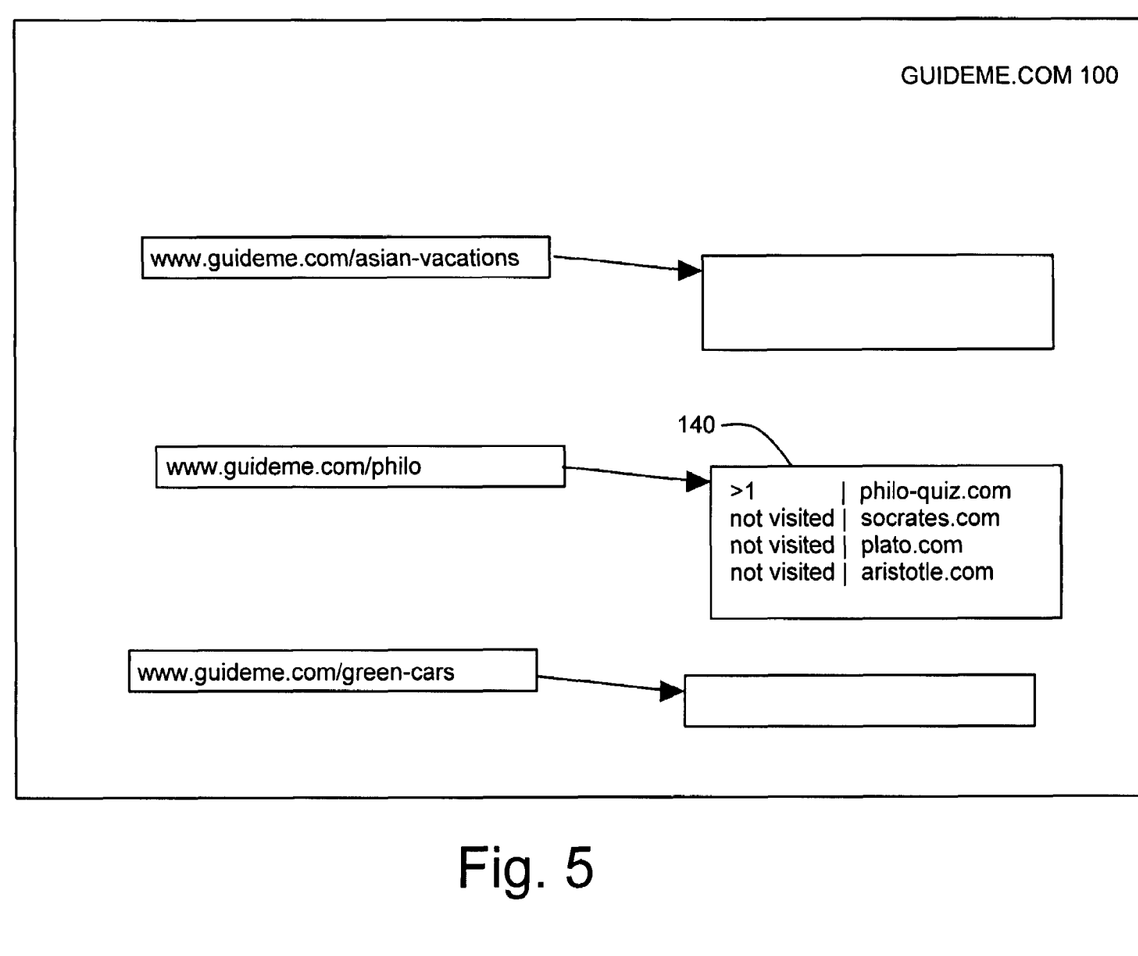
FIG. 5 is a diagram of other data structures.

Process 110 retrieves record 140 associated with the path in the HTTP request line. This record is shown in FIG. 5. Record 140 is essentially a set of rules for generating a page to be sent to browser 10. Each row is a rule that is executed in order. There are two types of rule, a "not visited rule" that is satisfied if the page specified in the rule has not yet been visited; and a threshold rule (">") that is satisfied if the page specified in the rule has not yet been visited and more than a threshold number of other pages of rule set have already been visited by the user.

In the case of responding to request 14, the threshold rule on the first row has not been satisfied, since the user has only visited 1 other page in the rule set (plato.com). The second row is satisfied, because the user has not yet visited socrates.com. Thus, process 110 generates a redirection request 114 to socrates.com, including the anonymous UID as a parameter (in the request header), and sends the redirection request to browser 10.

In response, browser 10 sends an HTTP GET request 16 to server socrates.com 210, via global Internet 20.

In process 222, server 210 generates an HTML page. Because request 16 does include "UID= . . . " as a parameter, process 222 of server 210 inserts the value of UID as a hidden variable into the HTML page. Process 222 sends the HTML page to browser 10 via HTTP response 214.

Person 105 then reads the HTML page from server 210. At the end of the HTML page, there appears on screen 116 the text MORE ABOUT GREEK PHILOSOPHY. More specifically, the HTML page, generated by server 210, includes <a href="http://www.guideme/philo">MORE ABOUT GREEK PHILOSOPHY</a>.

Person 105 selects this text using mouse 114, causing browser 10 to send an HTTP request 18, containing "GET www.guideme.com/philo" and "UID= . . . ", to server 100.

Figure 4B:
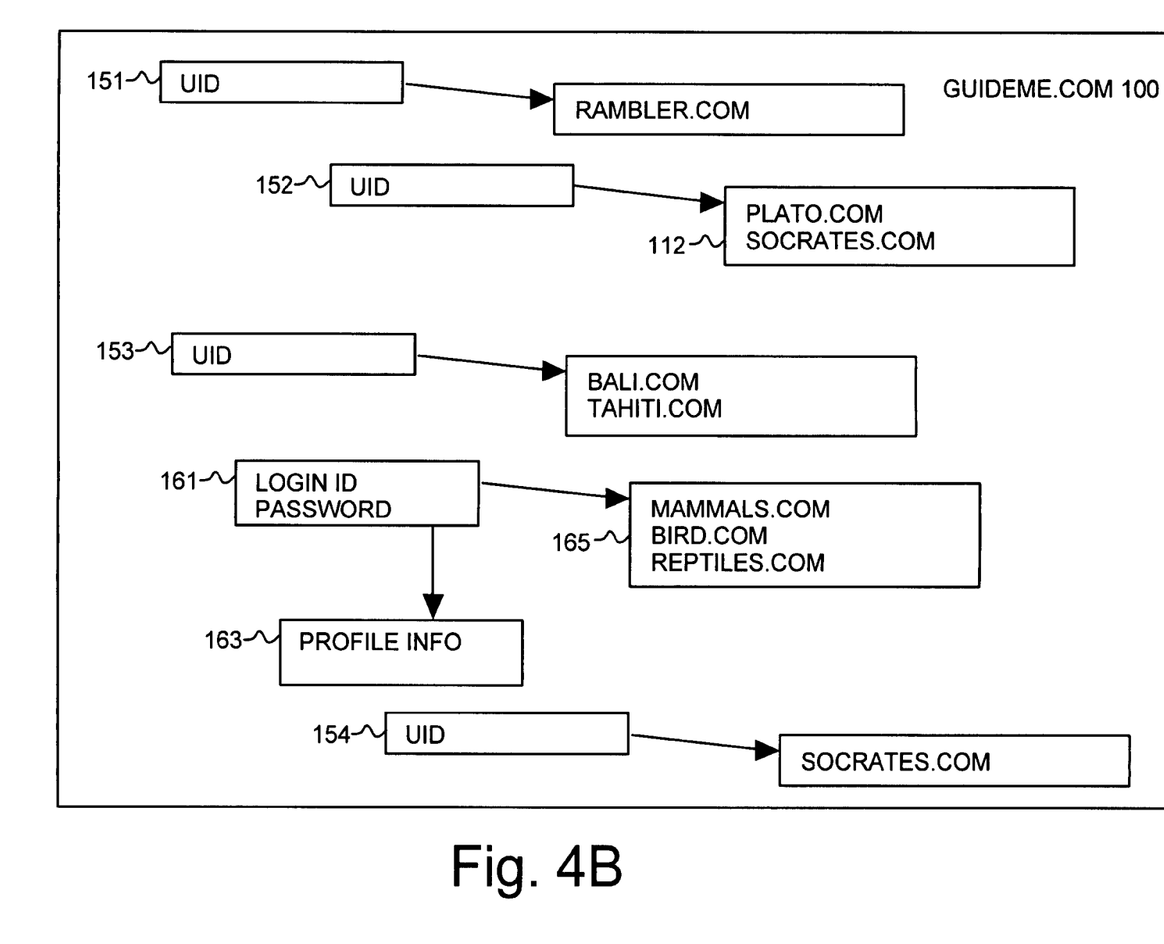

Process 110 retrieves history 112 associated with the UID and adds the Referrer Field of the HTTP header to the history. Thus, in the case of responding to request 18, FIG. 4B shows user history 112 after step 20.

Process 110 retrieves record 140 associated with the path in the HTTP request line. (FIG. 5).

In the case of responding to request 18, the threshold rule on the first row has been satisfied, since the user has now visited 2 other pages in the rule set (2>1). Thus, process 110 generates a redirection request 118 to philo-quiz.com, including the UID as a parameter, and sends the redirection request to browser 10.

In response, browser 10 sends an HTTP GET request 20 to server philo-quiz.com 240, via global Internet 20.

In process 222, server 240 generates an HTML page. Because request 20 includes "UID= . . . " as a parameter, process 222 of server 240 inserts the value of UID as a hidden variable into the HTML page. Process 222 sends the HTML page to browser 10 via HTTP response 244.

Person 105 then reads the HTML page from server 240. At the end of the HTML page, there appears on screen 116 the text MORE ABOUT GREEK PHILOSOPHY. More specifically, the HTML page, generated by server 240, includes <a href="http://www.guideme/philo">MORE ABOUT GREEK PHILOSOPHY</a>.

Person 105 selects this text using mouse 114, causing browser 10 to send an HTTP request 22, containing "GET www.guideme.com/philo" and "UID= . . . ", to server 100.

Figure 4C:
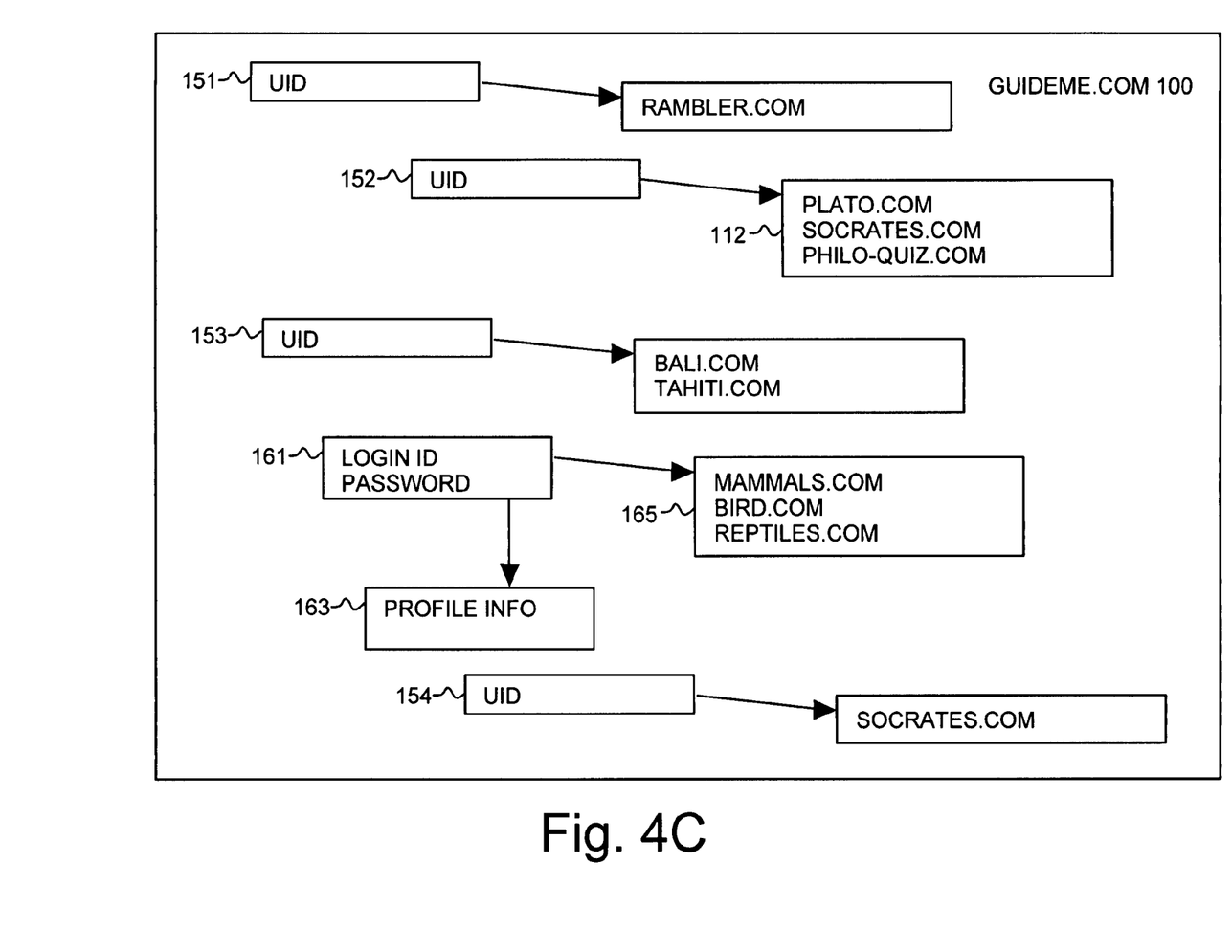

Process 110 retrieves history 112 associated with the UID and adds the Referrer Field of the HTTP header to the history. Thus, in the case of responding to request 22, FIG. 4C shows user history 112 after step 20.

Process 110 retrieves record 140 associated with the path in the HTTP request line. (FIG. 5).

In the case of responding to request 22, process 110 generates a redirection request 122 to aristotle.com, including the anonymous UID as a parameter, and sends the redirection request to browser 10.

In response, browser 10 sends an HTTP GET request 24 to server aristotle.com 230, via global Internet 20.

In process 222, server 230 generates an HTML page. Because request 20 includes "UID= . . . " as a parameter, process 222 of server 230 inserts the value of UID as a hidden variable into the HTML page. Process 222 sends the HTML page to browser 10 via HTTP response 234.

In other words, server 100 acts to receive an HTTP request 22 from browser 10. Request 22 is a type of anonymous signal, meaning that request 22 is not associated with a login ID and password. Server 100 generates the URL of server 230 by reading history record 112 and record 140 to determine that browser 10 has not visited server 230. Thus, the combination of rules in record 140 is one way of defining a sequence of URLs.

The anonymous UID in the redirection request 122 generated by server 100 is the UID in record 152, which is associated with history record 112, stored apart from the browser 10. In other words, browser 10 does not access the record 112.

Person 105 then reads the HTML page from server 240. On the HTML page, there appears on screen 116 the text LOGIN TO SEE YOUR TRANSCRIPT. More specifically, the HTML page, generated by server 240, includes <a href="http://www.guideme/login"> LOGIN TO SEE YOUR TRANSCRIPT </a>.

Person 105 selects this text using mouse 114, causing browser 10 to send an HTTP request 26, containing "GET www.guideme.com/login" and "UID= . . . ", to server 100.

Figure 4D:
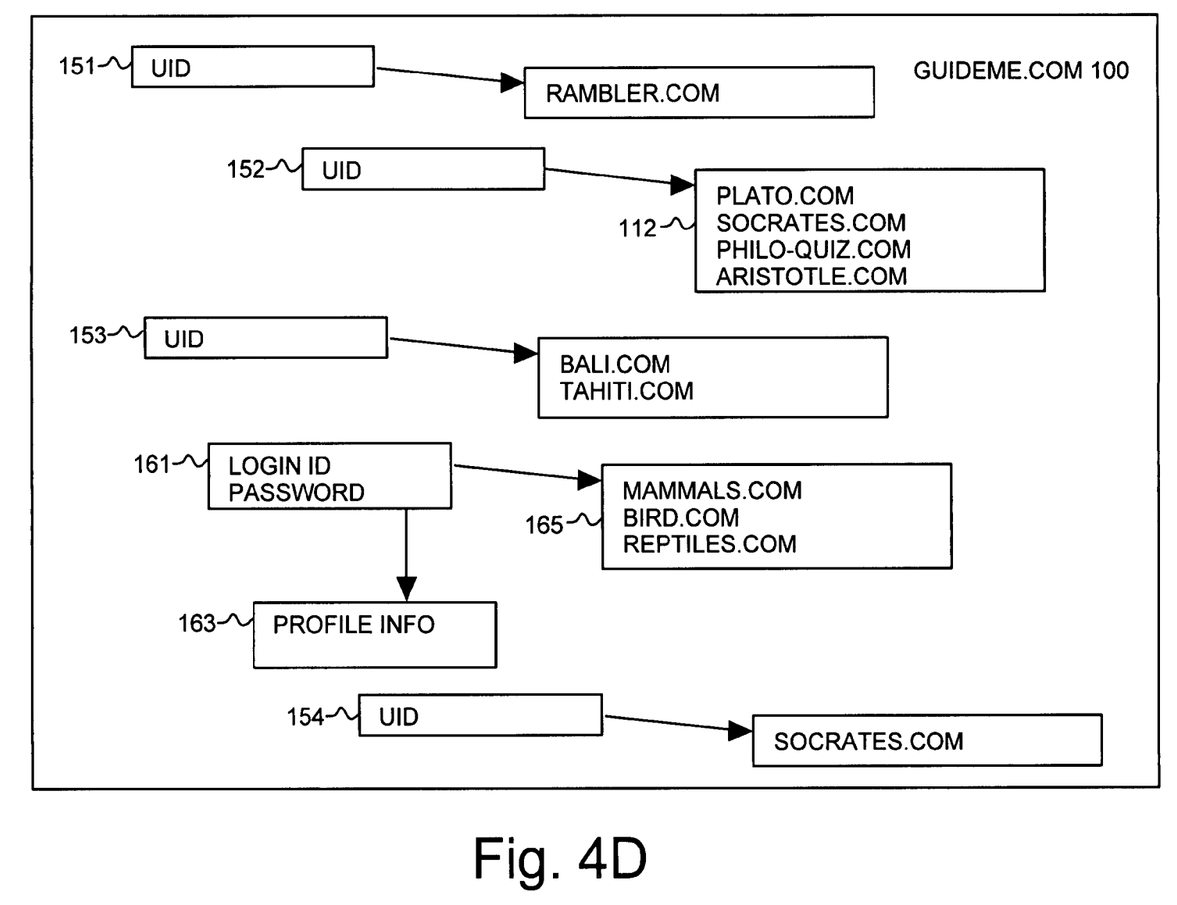
Figure 9:
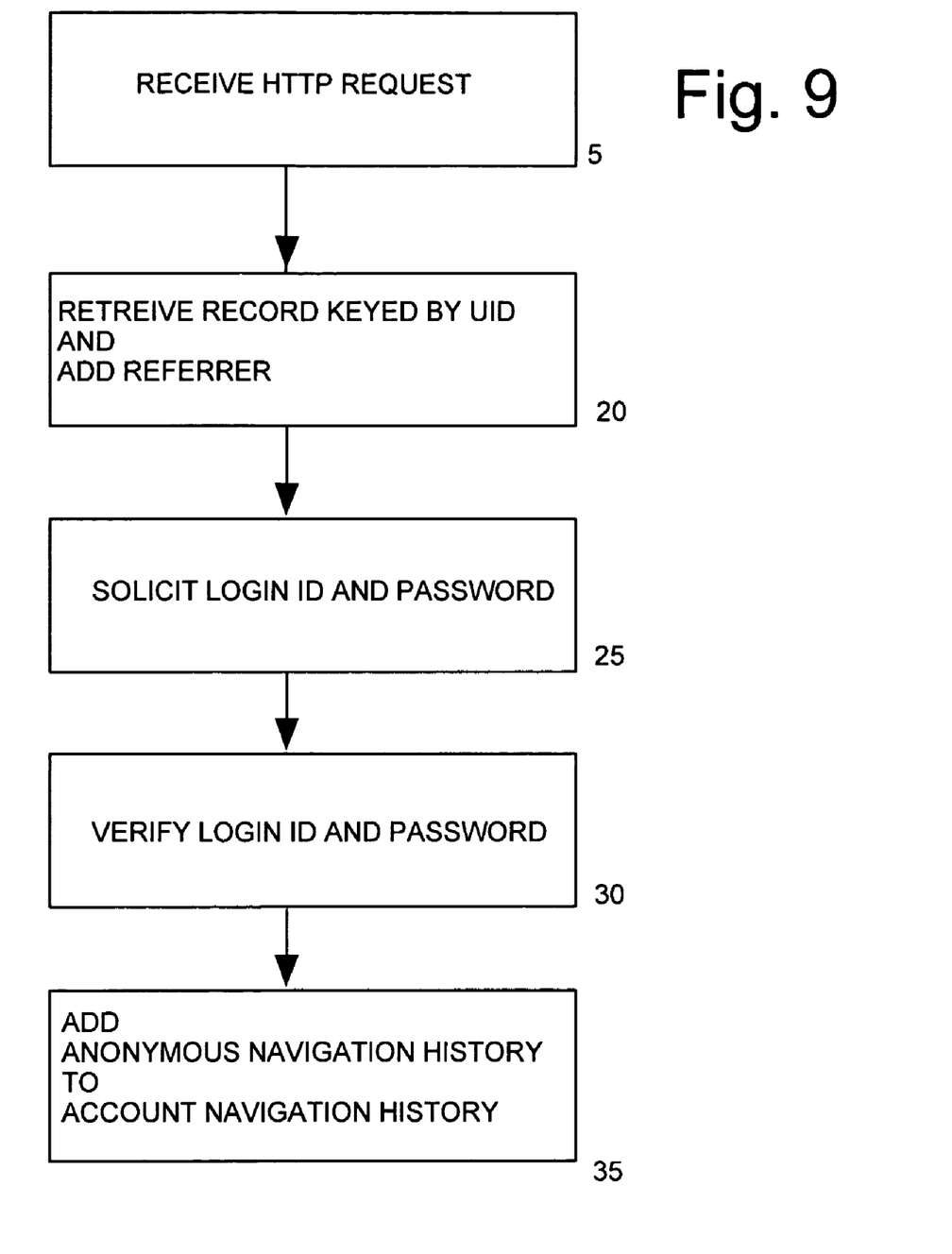
FIG. 9 is a flowchart of another process performed by the server in the first exemplary system.

FIG. 9 is a flow chart of the process 117 effected by server 100 in response to an HTTP GET having "login" in the path of the request line. Process 117 retrieves the history associated with the anonymous UID and adds the Referrer Field of the HTTP header to the history. Thus, in the case of responding to request 26, FIG. 4D shows user history 112 after step 20.

Process 117 sends an HTML page 126 (FIG. 2) to browser 10. HTML page 126 includes a Form that solicits a login ID and password from user 105. (step 25). Invocation of the form by person 105 causes browser 10 to send a request 28, containing the login ID and password, to server 10.

Server 100 checks the validity of the received login ID and password (step 30). If the login ID and password are valid, server 100 uses the login ID to find a record 165 via record 161.

Data structure 161 was previously created when user 105 set up an account. The password in data structure 161 was selected by user 105. Profile data 163 contains information given by user 105 at account setup. Data 163 includes preferences and demographic information. Record 165 is a history of navigation by user 105.

Figure 4E:
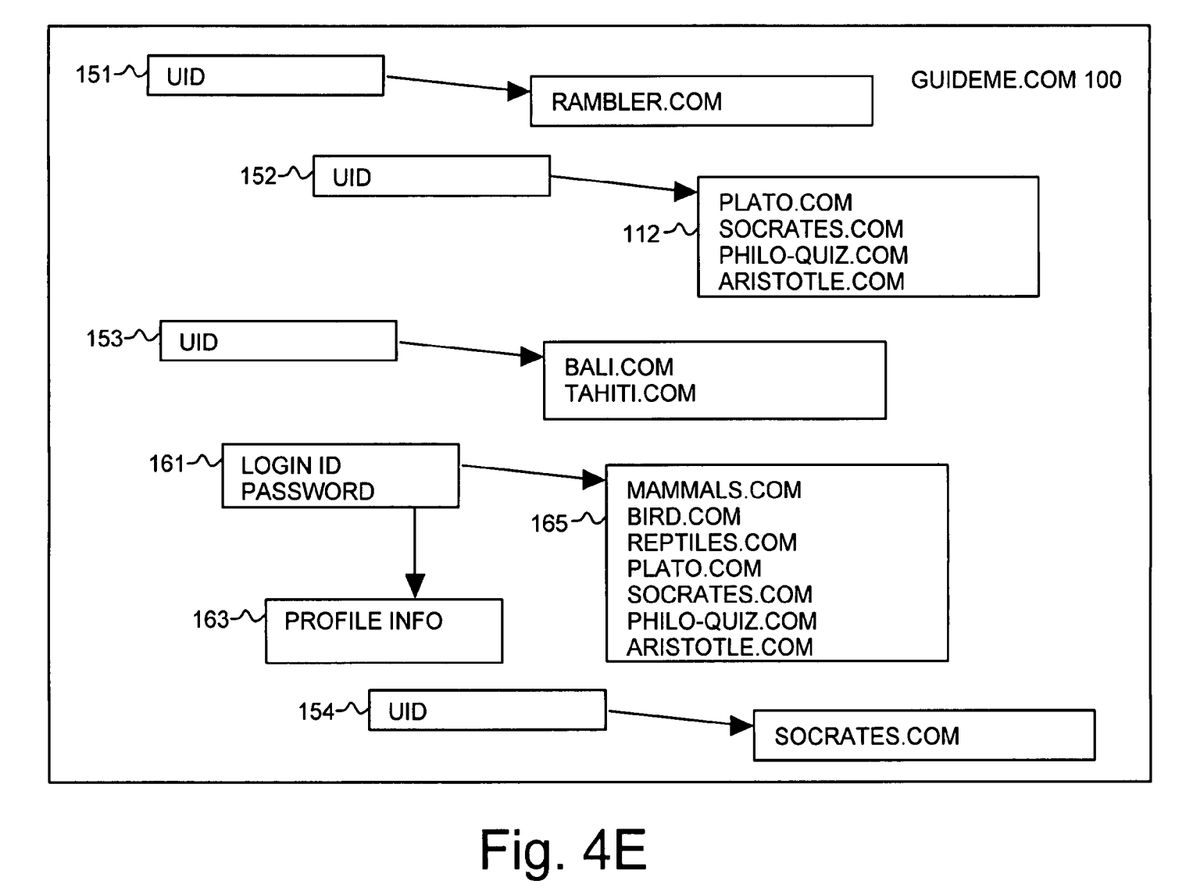

Server 100 then modifies record 165, by appending the content of record 112 to record 165, as shown in FIG. 4E (step 35).

Second Exemplary System

Figure 6:
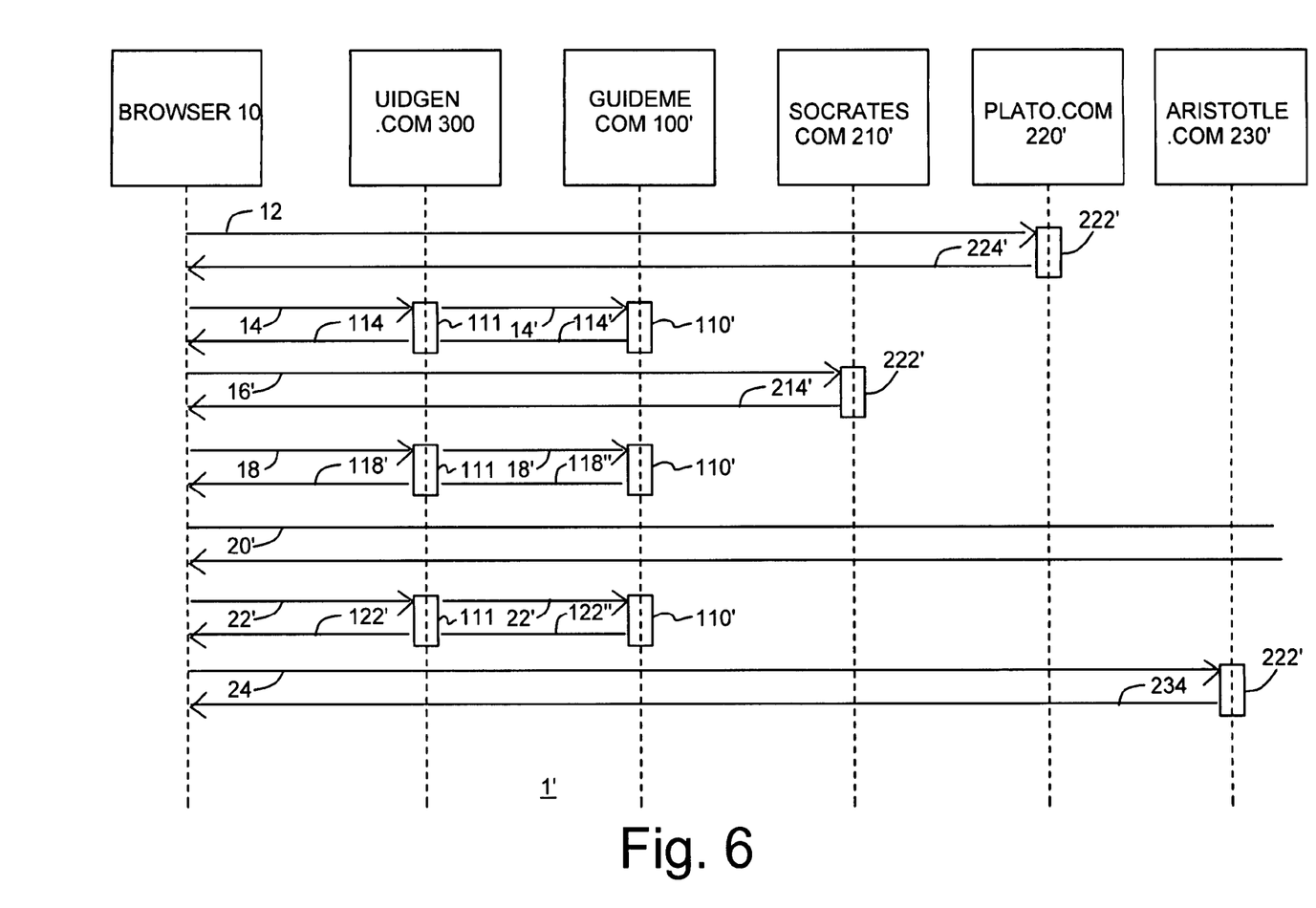
FIG. 6 shows a second exemplary system in accordance with another embodiment of the present invention.

FIG. 6 is a diagram showing sequences of HTTP requests and responses exchanged between electronic processors in system 1', according to a second exemplary system. In response to receiving HTTP GET request 12 from browser 10, process 222', executed by server 220', generates an HTML page and sends the HTML page to browser 10 via HTTP response 224'. Response 224 includes any cookies received in the header of request 12.

Person 105 then reads the HTML page from server 220'. At the end of the HTML page, there appears on screen 116 the text MORE ABOUT GREEK PHILOSOPHY. More specifically, the HTML page, generated by server 220', includes <a href="http://www.guideme/philo">MORE ABOUT GREEK PHILOSOPHY</a>.

Person 105 selects this text using mouse 114, causing browser 10 to send an HTTP request 14, containing "GET www.uidgen.com/philo", to server 300.

Figure 7:
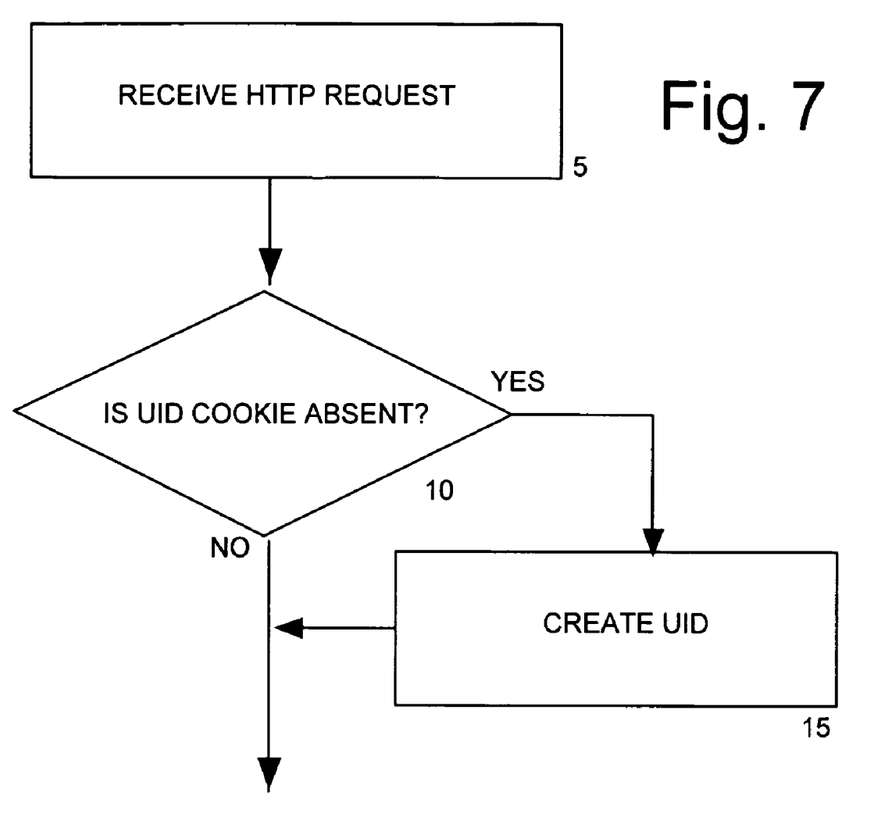
FIG. 7 is a flowchart of a process performed by a server in the second exemplary system.

FIG. 7 shows a flow chart of the process 111 effected by server 300 in response to a GET request. If header of the request does not contain a cookie named UID (step 10), process 110 creates a unique identifier, and inserts a cookie have the value of the unique identifier into the header of request 14. (step 15). Thus, in the case of responding to request 14, process 111 does create an identifier and insert the corresponding cookie into the header of request 14. Process 111 forwards the header and body of request 14 via a HTTP request containing the request line "GET www.guideme.com/philo", to guideme.com server 100' via request 14'.

Figure 8:
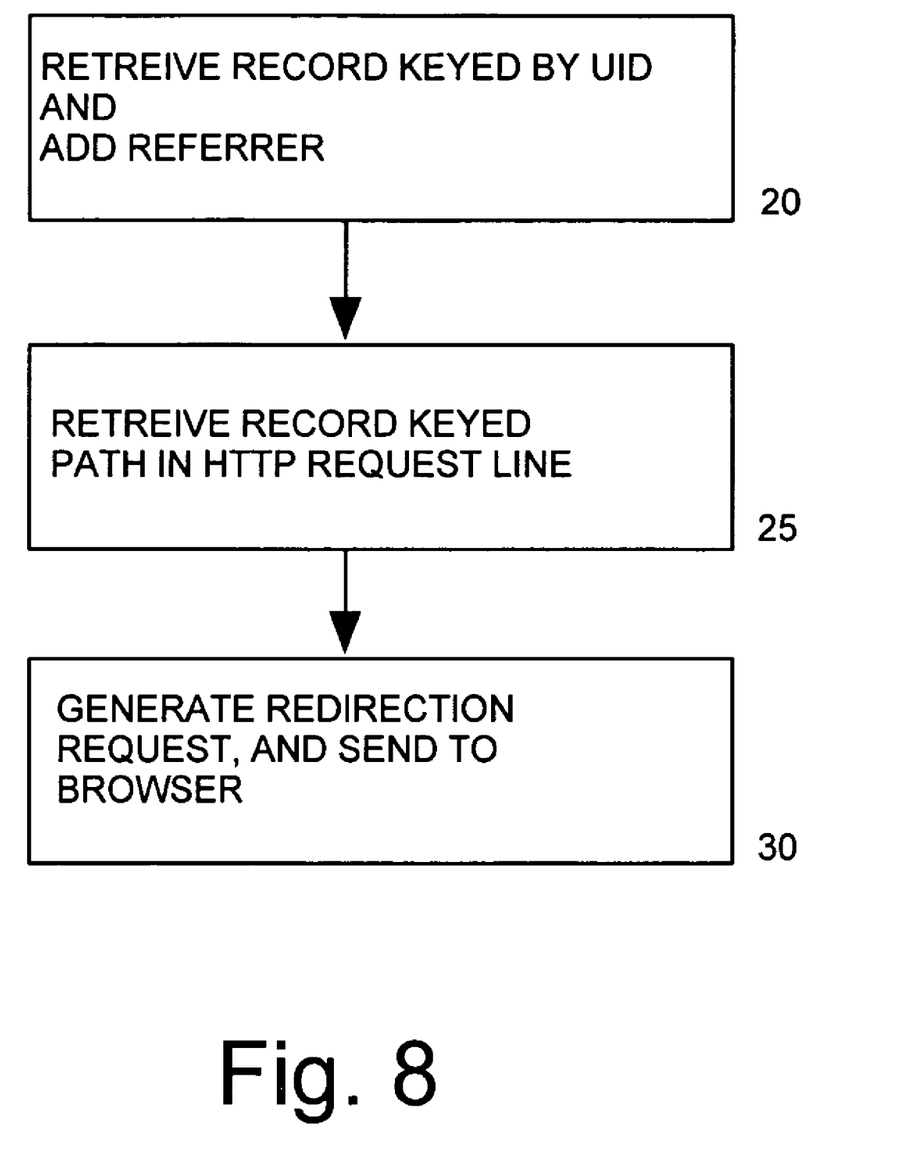
FIG. 8 is a flowchart of a process performed by another server in the second exemplary system.

FIG. 8 shows a flow chart of the process 110' effected by server 100' in response to a GET request. Process 110' retrieves the history associated with the UID cookie, and adds the Referrer Field of the HTTP header to the history.

Process 110' retrieves record 140 associated with the path in the HTTP request line.

In the case of responding to request 14', the threshold rule on the first row has not been satisfied, since the user has only visited 1 other page in the rule set (plato.com). The second row is satisfied, because the user has not yet visited socrates.com. Thus, process 110' generates a redirection request 114' to socrates.com, including the cookie UID in the HTTP header, and sends the redirection request to browser 10, via uidgen.com server 300.

In response, browser 10 sends an HTTP GET request 16' to server socrates.com 210', via global Internet 20.

In process 222', server 210 generates an HTML page. Process 222' sends the HTML page to browser 10 via HTTP response 214'.

Third Exemplary System

An exemplary system in accordance with a third exemplary embodiment includes guideme.com server 100" that fetches the target pages from servers 210, 220, and 230, and sends the fetched pages to browser 10. This is contrasted with guideme.com server 100 of the first exemplary system, which employs redirection to have browser 10 fetch the target pages.

Thus, the exemplary systems allows a user to enter the workflow at any point and guiding the user around to sites they may not have been to by tracking the person's uid. In some cases, the user may need to visit a threshold of sites via our guided navigation before special offers or new features are presented to the user.

A user visits a website that may or may not have rich media content (flash, silverlight, javafx) The page may be generated with hidden fields, url parameters, or parameters that are carried by the rich media application. Once the user clicks on a cross domain link, object, or commits an action that invokes the call, the application then calls the Global Guidance server.

As long as an anonymous user navigates between the sites the global guidance server can passively track the user or actively guide the user form one site to another. Each site that the user goes to is stored in the database. This can be useful if a user must reach a threshold of sites.

The global guidance system can perform the following:

Send the user to a random site in the global navigation list.

Send the user to a random site in the global navigation list that the user has not visited.

Send the user to a specific page determined by a workflow that keeps an ordered list of which sites to which the the user navigates.

Send special permissions if the user has reached an unlock threshold based on the number of sites they have visited.

Send special permissions if the user has visited specific sites.

Present special offers across sites via a special offer code that is determined based on what sites the user has visited.

Throughout this Patent Application, certain processing may be depicted in serial, parallel, or other fashion, for ease of description. Actual hardware and software realizations, however, may be varied depending on desired optimizations apparent to one of ordinary skill in the art.

In this Patent Application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array. Thus, circuitry encompasses, for example, a general-purpose electronic processor programmed with software, acting to carry out a described function.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

The order of appearance of steps does not necessarily denote an order of execution.

We claim:

1. A method for operating with a system of computer networks having a plurality of Internet domains, the method comprising:

receiving a first signal from a browser via the system of computer networks, the first signal being anonymous, the step of receiving being performed by a server;

accessing a first data structure, the first data structure defining a sequence of 3 resource identifiers, each resource identifier corresponding to one of the plurality of Internet domains, the first data structure being stored apart from the browser, the step of accessing a first data structure being performed by a server;

accessing a second data structure, the second data structure having information corresponding to a signal previously accessed by the browser, the second data structures being stored apart from the browser;

selectively determining a resource identifier defined by the first data structure, the step of selectively determining depending on whether a content of the second data structure corresponds to a content of the first data structure;

generating a second signal, the second signal corresponding to the determined resource identifier and a third signal, the third signal being associated with the second data structure;

sending the second signal through the system of computer networks, to allow the browser to access a signal associated with the determined resource identifier; and responsive to the first signal, writing to the second data structure in accordance with an origin of a content of the first signal.

* * * * *